July 24, 1956

R. M. A. BARON 2,756,354

ARMATURES OF ELECTRIC MOTORS

Filed March 9, 1955

United States Patent Office 2,756,354
Patented July 24, 1956

2,756,354
ARMATURES OF ELECTRIC MOTORS

Raoul Marie Amedee Baron, Paris, France, assignor to Outillage Electrique Silex S. A., Nationalité Francaise Industrielle, Bagnolet, France Application March 9, 1955, Serial No. 493,271

Claims priority, application France Mar. 16, 1954

12 Claims. (Cl. 310—43)

The present invention relates to the armatures of electric motors, more particularly, armatures of small power electric motors such as those used, for instance, in portable tools (drills), and vacuum cleaners.

The main object of the invention is to provide an armature of the type hereinabove referred to which may be manufactured more easily and at a lower cost price than heretofore.

Another object of the invention is to provide an armature of the type hereinabove referred to of which the winding may be effected quite readily without rendering it necessary to cut off the wire upon completion of each individual coil.

Figure 1:
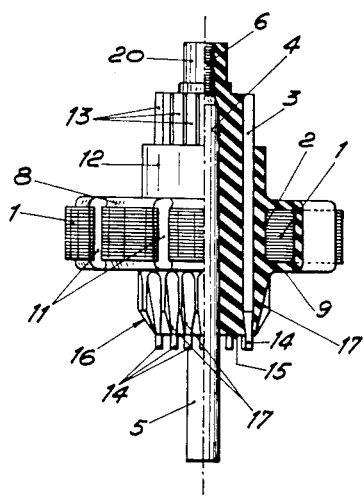
Figure 2:
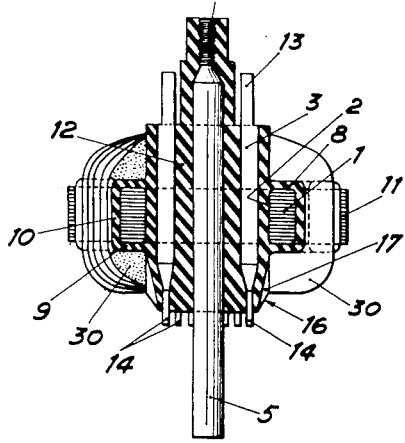
Figures 5, 6:
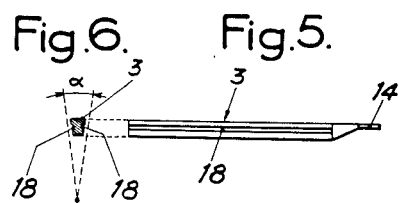
Figure 3:
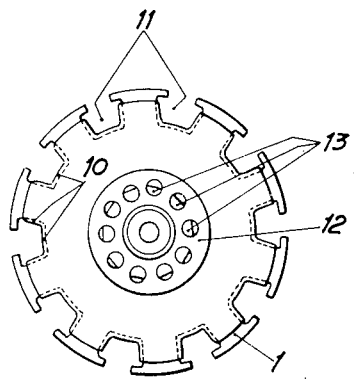
Figure 4:
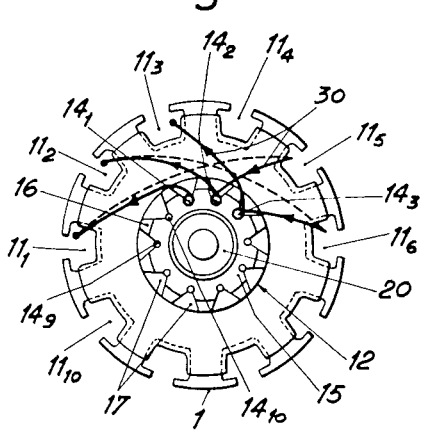

Other and further objects and advantages of the invention will be apparent to those skilled in the art, from a consideration of the following description of some embodiments of the invention, shown by way of example in the accompanying drawings, in which:

Fig. 1 is an elevational view, with one half thereof in axial section, of armature not yet wound and such as obtained from a moulding operation, Fig. 2 is a longitudinal axial section of a modification of an armature according to the invention with its winding, Fig. 3 is an end view of the unwound armature as seen from the commutator side, Fig. 4 is an end view of the armature as seen from the side where the armature coils are connected to the segments of the commutator, a fragmentary wiring diagram also being shown, Fig. 5 is a longitudinal elevational view of a rod serving as a commutator segment, and Fig. 6 is a cross-section of the rod shown in Fig. 5.

According to the invention, the rotor or armature is obtained by placing in a mould a stack of annular iron sheet stampings 1 provided with slots on the periphery thereof and pressed against one another along their peripheral edges by two parts of the mould. Accurately positioned by their end portions in the walls of the mould are rods or bars 3 regularly arranged within the central hole 2 of this stack iron sheet stampings, concentrically with the armature axis. Said rods 3 will serve as commutator segments or bars and are preferably made of copper. Within said central bore 2 are also positioned the cores which are necessary for leaving free a bore adapted to receive the shaft 5 of the motor and, in the example illustrated, the threaded bore 6 for a screw intended to secure the blades of a cooling fan for the motor. A body of insulating plastic material is injected under pressure and this body once solidified, firmly holds pressed together the laminations or stampings 1 of the armature the outer faces of which are thus enclosed between two flanges 8 and 9 apertured opposite each or slot notch 11 of the armature. These flanges 8, 9 are joined during moulding by a thin wall of plastics 10, in each notch, so that the individual slots are conveniently lined with insulating material adapted to receive the coils of the armature, whereby said coils are suitably electrically insulated from the iron armature 1.

Said flanges 8 and 9 are solid with the core 12 moulded in the central bore 2 and formed with an axial bore 4 adapted to subsequently receive the armature shaft 5. In some instances, this core 12 may be moulded directly on the spindle 5.

In the example illustrated, the core 12 is formed with an extension 20 serving as a journal at one end thereof. This arrangement is not a feature of the invention.

The rods 3 are embedded in the core 12 except at their ends which protrude out of said core. At one of their ends, the rods 3 are turned on their outer face concentrically with the axis of the shaft 5 (see Fig. 3), on a given length corresponding to the width of the commutator 13 thus formed. If the rods 5 are cylindrical in shape, as illustrated in Figs. 1 and 3, the turning operation just referred to causes the gap between two successive commutator segments 13 to be reduced.

The opposite ends of the rods 3 are reduced in diameter before they are set into the mould and are formed with connecting pins 14 which protrude about 3 to 4 mm. out of the adjacent end face of the core 12. This end of the core 12, which is conical in shape for instance as at 16, is formed with V-shaped recesses 17 the apex of which is located near the corresponding pin 14.

By virtue of the existence of the pins 14 each connected to a given commutator bar and positioned at one end of the armature while the commutator bars are left entirely free at the other end thereof, it is possible to effect a continuous winding of the armature, the connections of the individual coils thereof being effected on said spikes which protrude out of the corresponding end face of the core 12.

This makes it possible to do away with the provision of the conventional twisted loops adapted to be subsequently cut to length and soldered endwise on one end of the corresponding commutator segments.

According to the arrangement of the invention, it is possible to adopt the following wiring diagram for winding an armature as shown in Fig. 4, which comprises ten slots and armature coils between slots of order $n$ and $n+4$.

The wire 30 is first looped at its end around the pin $14_1$, enters the slot $11_1$ and then the slot $11_5$, enters again $11_1$ and then $11_5$, and after the required number of turns comes out of $11_5$ and is rolled around the pin $14_2$. From the pin $14_2$ the same wire enters the notch $11_2$ in order to be coiled between $11_2$ and $11_6$; it comes out of $11_6$ and is looped on the pin $14_3$ whence it is directed toward slot $11_3$ etc.

Finally, after having been looped round the pin $14_{10}$, the wire is coiled into the last coil of the winding between $11_{10}$ and $11_3$ which it leaves and ultimately is looped around the initial pin $14_1$, thus completing the winding.

Subsequent to the conventional scouring, the individual loops will be soldered to the corresponding pins 14 by being dipped into a bath of molten tin. The individual loops are thus connected to the corresponding commutator bars without the necessity for the individual twisted taps to be reserved in the course of the winding operation and to be subsequently prepared and soldered, one after the other. Furthermore, the winding operation is not hindered by the presence of such bulky twisted loops as is the case with the conventional commutator rotors.

The setting into place of the wire looped about the pins 14 is facilitated by the recesses 17 in which the wire is run toward and from the corresponding pin 14.

Obviously, this rotor arrangement and, particularly, the arrangement of the protruding rods which form the commutator and which protrude from the opposite end of the core renders the construction and the winding of this armature very simple.

As many changes could be made in the above construction, and many apparently widely different embodiments of this invention could be made without departing from the scope of the claims, it is intended that all matter contained in the above description or shown in the accompanying shall be interpreted as illustrative and not in a limiting sense.

In particular, the rods which form the commutator may be either completely cleared off the core 12 in the inner portion of the commutator, as shown in Fig. 2, or they may be embedded in this core in the portion thereof located inside the cylindrical contact surface of the brushes which are adapted to cooperate with the commutator.

The rods 3, instead of being cylindrical in shape, may have a tapering cross-section (Figs. 5 and 6), so that the gap between two adjacent rods is constant in radial direction.

These rods may also have their lateral faces formed with a longitudinal groove 18 (Figs. 5 and 6) in the portion thereof which forms the commutator bars in order to improve the strength of the commutator. As a rule, this feature is useless since the rods are firmly secured on a substantial length thereof embedded within the insulating core 12.

The number of the rods which, in the example illustrated, is equal to the number of the armature slots may be, according to a known practice, chosen equal to a whole multiple of the number of the slots.

What I claim is:

1. Armature for electric motors comprised of a stack of circular iron laminations with a central bore and winding slots of the outer periphery thereof, a cylindrical body of insulating material securedly positioned within said bore of said laminations and formed with cylindrical extensions which protrude axially out of said stack of laminations, said cylindrical body having an axial bore extending at least along a portion thereof, a shaft positioned within said axial bore of said insulating body and rigid therewith, electrically conductive metal rods positioned within said insulating body and extensions thereof on a cylindrical geometrical surface co-axial with the axis of said body, said rods being arranged parallel with said axis close to each other though leaving a thin gap therebetween, said rods having one end thereof protruding out of said insulating body and together forming a cylindrical commutator bearing surface for conventional current-carrying brushes and having their other end formed into a connecting pin, insulating means in said slots, and an electric winding comprised of a single wire wound into suitable coils extending through said slots of said laminations and having their terminal portions looped around the respective connecting pins and electrically connected thereto.

2. The armature of claim 1, wherein said insulating body is obtained by a molding operation.

3. The armature of claim 1, wherein the end faces of said laminated stack are lined with insulating flanges cut-off in the portions thereof which are in register with said slots of said laminations.

4. The armature of claim 1, with insulating flanges on the end faces of said laminated stack cut-off in the portion thereof which are in register, with said slots of said laminations, said insulating body, said slot insulating means, and said insulating flanges being all integrally molded.

5. The armature of claim 1, wherein said metal rods are circular in cross-section and machined as a whole in order to provide for said cylindrical commutator bearing face.

6. The armature of claim 1, wherein said metal rods are trapezoidal in cross-section so as to leave therebetween a gap of substantial constant width radially.

7. The armature of claim 1, wherein said insulating body is obtained by a molding operation and wherein said metal rods are formed with lateral longitudinal grooves adapted to be filled up by insulating material when said insulating body is being moulded.

8. The armature of claim 1, wherein the commutator end of said metal rods is entirely embedded in said insulating body except for the portion thereof adjacent said cylindrical commutator bearing face.

9. The armature of claim 1, wherein the commutator end of said metal rods is cleared all around the cross-section thereof and, therefore, supported in cantilever relation by and with respect to said insulating body.

10. The armature of claim 1, wherein the end portion of said insulating body adjacent said connecting pins is frusto-conical in shape.

11. The armature of claim 1, wherein the end portion of said insulating body adjacent said connecting pins is formed with V-shaped notches merging toward said connecting pins.

12. The armature of claim 1, wherein one end portion of said insulating body is formed into a supporting journal for said armature.

No references cited.